Feb. 22, 1966   J. V. FETTERMAN   3,236,058
SEPARATION SYSTEM
Filed Feb. 2, 1962
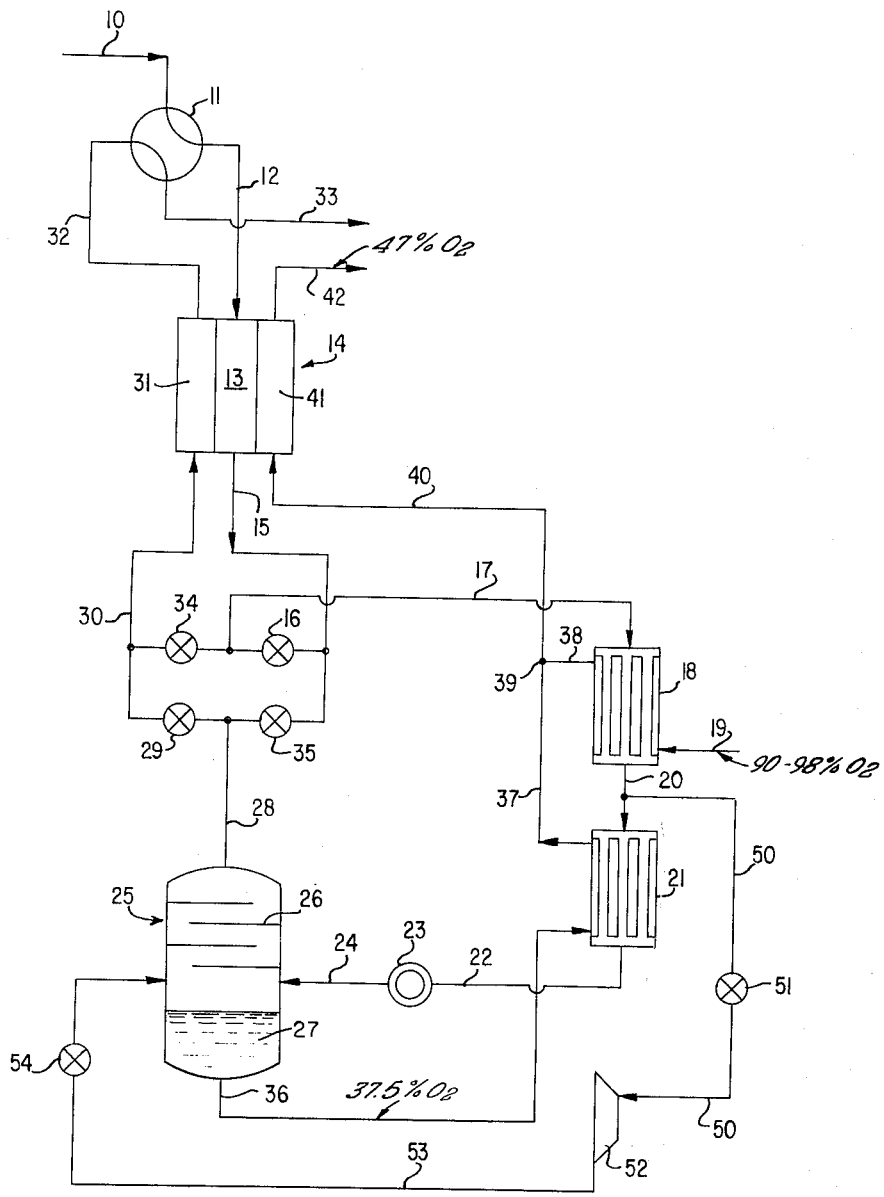
INVENTOR.
JAY V. FETTERMAN
BY Shanley & O'Neil
ATTORNEYS.

3,236,058
SEPARATION SYSTEM
Jay V. Fetterman, Emmaus, Pa., assignor to Air Products and Chemicals, Inc., a corporation of Delaware
Filed Feb. 2, 1962, Ser. No. 170,615
5 Claims. (Cl. 62—13)

The present invention relates to low temperature separation of gaseous mixtures and more particularly to methods of and apparatus for producing from a gaseous mixture a product including components of the gaseous mixture in which one of the components comprises a greater percentage of the product relative to its percentage of the gaseous mixture.

The methods and apparatus provided by the present invention have utility in situations where desired percentages of components of gaseous mixtures are not capable of being obtained by partial liquefaction and separation alone and the invention is illustrated only by way of example in connection with the production of oxygen enriched mixture derived from air.

In the operation of certain types of combustion and metallurgical equipment such as blast furnaces it is known that performance is greatly improved by the use of combustion supporting gases that are richer in oxygen than is air. Although the performance increases in proportion to increases of oxygen content above that present in air, it has been determined that in certain operations the use of enriched air below about 40% oxygen composition does not provide a degree of improved performance to justify the expense involved in providing such enriched air or the equipment required for its use, while the cost of oxygen of high purity, from 90% to 98% oxygen which is commercially available, does not provide the optimum economical solution in view of the cost of such commercially available oxygen and of the equipment required for its use. Accordingly, it would be advantageous if a source of intermediate purity oxygen such as from 40% to 50% oxygen enriched air was available.

One of the simplest ways to increase the percentage of one component of a gaseous mixture is by partial liquefaction of the gaseous mixture followed by separation of the portions in liquid and vapor phase. However, due to the characteristics of certain gaseous mixtures, such as air, there is a limit to the extent of increase in the high boiling point component which can be achieved by the condensation method; in the case of air, it is only possible economically to obtain a mixture including about 30% oxygen by the condensation method. While other techniques are available for producing higher percentages of oxygen the cost involved would be greater than that required to provide a fractionating system which provides oxygen of 90% to 98% purity. Accordingly, no arrangement is available for economically providing enriched air having an oxygen composition of the order of 40% to 50%.

Accordingly, it is an object of the present invention to provide methods of and apparatus for the relatively inexpensive production of large quantities of gaseous mixtures enriched in one component.

Another object of the present invention is the provision of methods of and apparatus for the production of enriched gaseous mixtures, in which the energy input requirements of the cycle are desirably low.

Still another object is to provide methods of and apparatus for producing enriched gaseous mixtures, which are easy to practice and which result in a product of relatively uniform enrichment.

A still further object of the present invention is to provide apparatus for producing enriched gaseous mixtures, which are inexpensive to manufacture, install, maintain and operate.

Other objects and advantages of the present invention will become apparent from a consideration of the following description taken in conjunction with the accompanying drawing in which the single figure is a diagrammatic representation of a system embodying principles of the present invention.

Broadly stated the present invention comprises methods of and apparatus for producing gaseous mixtures enriched in one component in which gaseous mixture comprising the feed is partially liquefied and a fluid separated therefrom, the separated fluid may comprise the liquid portion richer in a relatively high boiling point component of the feed mixture. The separated fluid is then mixed with another fluid having a higher percentage of the high boiling point component than exists in the separated fluid to provide a mixture having the desired percentage of the high boiling point component. A heat exchange arrangement is provided for effecting partial liquefaction of the gaseous mixture in which portion of the necessary refrigeration is obtained from the fluid having a higher percentage of the specific component and by which high boiling point impurities are removed from the gaseous feed mixture.

Referring now to the drawing there is shown a system embodying the principles of the present invention in which atmospheric air at a temperature of about 90° F. and a pressure of about 45 p.s.i.a., for example, flows through a conduit 10 to a reversing valve 11 and thence through conduit 12 to passageway 13 of a reversing heat exchange device 14. Cooled air leaves the cold end of the passageway 13 through conduit 15, flows through switching valve 16 and then through conduit 17 to the warm end of the tube side of a heat exchange device 18. The shell side of the heat exchange device 18 is fed with relatively cold fluid through conduit 19, as described below, and the feed mixture leaves the cold end of the heat exchange device 18 at a lower temperature through conduit 20 and is conducted thereby to the warm end of the tube side of a heat exchange device 21 for countercurrent heat interchange with a relatively cold fluid flowing through the shell side of the latter heat exchange device as described below.

The feed mixture leaves the cold end of the heat exchange device 21 through conduit 22 partially in liquid phase, for example the feed mixture in conduit 22 may be at a pressure of about 45 p.s.i.a., a temperature of about −295° F. and comprises about 34% liquid. The partially liquefied feed mixture is conducted by the conduit 22 to an expansion valve 23 by which its pressure is reduced to about 22 p.s.i.a. with a further decrease in temperature to about −309° F. The expanded feed mixture is introduced by conduit 24 to a phase separator 25, the feed mixture entering the phase separator may comprise about 30% liquid. The phase separator 25 may be provided with a plurality of vertically spaced horizontal baffles 26 to enhance the separation.

In the phase separator 25 a very crude separation of the air feed is effected, the liquid phase collecting in a pool 27 in the bottom of the separator having an oxygen composition of about 37.5% while the vapor portion, or the gaseous effluent, which leaves the upper end of the separator through conduit 28, contains about 86.1% nitrogen and about 13.9% oxygen. The gaseous effluent which leaves the separator 25 at about −314° F. is conducted by conduit 28, past the switching valve 29 and by conduit 30 for flow through passageway 31 of the heat exchange device 14 in countercurrent heat exchange effecting relation with the air feed in the passageway 13. The gaseous effluent leaves the warm end of the passageway 31 at substantially ambient temperature and is withdrawn from the cycle through conduit 32 switching valve 11 and conduit 33.

When the air feed comprises atmospheric air, as distinguished from air feed derived from atmospheric air treated such as by a caustic scrubbing operation and driers for removing carbon dioxide and water, it will contain appreciable quantities of water vapor and carbon dioxide and the heat exchange device 14 is of the switching type to effect removal of such impurities from the atmospheric air feed. For this purpose the conduit 17 is connected to the conduit 30 through a switching valve 34 and the conduit 28 is connected to the conduit 15 through a switching valve 35. With this arrangement, with the switching valve 11 in the position shown, the air feed flows through the passageway 13, the conduit 15 and switching valve 16 to the conduit 17, while the gaseous effluent in the conduit 28 flows through the switching valve 29, the conduit 30 and the passageway 31 as previously described, the switching valves 34 and 35 being closed. Upon moving of the switching valve 11 to its second position in which the conduit 10 would be connected to the conduit 32 while the conduit 33 would communicate with the conduit 12, the air feed would flow through the passageway 31, the conduit 30 and switching valve 34 to the conduit 17, while the gaseous effluent would flow through switching valve 35 and conduit 15 to the passageway 13, the switching valves 16 and 29 being closed. The switching valves 16, 29, 34 and 35 may be operated mechanically in synchronism with the switching valve 11 or they may be of the type operable responsively to pressure differentials. The air feed mixture flowing through passageway 13 or 31 of the heat exchange device 14 is cooled to a temperature below the precipitation temperature of water and carbon dioxide and such impurities are deposited out in the passageway and such deposited impurities are derimed from the passageways of the heat exchange device 14 during the cycle in which the gaseous effluent flows through such passageways.

The liquid portion collecting in the pool 27 in the bottom of the phase separator 25 which contains about 37.5% oxygen is withdrawn by conduit 36 and flowed through the shell side of the heat exchange device 21 in countercurrent heat exchange effecting relation with the feed mixture, the liquid portion may enter the heat exchange device 21 at about −308° F. Such countercurrent heat interchange results in vaporization of the liquid portion, which leaves the warm end of the heat exchange device 21 through conduit 37, and partial liquefaction of the feed mixture as described above.

In accordance with the principles of the present invention, the vaporized material leaving the heat exchange device 21 through conduit 37 is mixed with a quantity of an auxiliary fluid having a higher percentage of the specific component to provide a composite stream comprising gaseous mixture including a desired percentage of the specific component, the auxiliary fluid flowing through conduit 38 which is connected to the conduit 37 at point 39 where the mixing occurs. The composite stream is conducted by conduit 40 for flow through passageway 41 of the heat exchange device 14 in countercurrent heat exchange effecting relation with the incoming feed mixture and leaves the passageway 14 through conduit 42 at substantially ambient temperature. The quantity of auxiliary fluid added will depend upon the purity of the auxiliary fluid with respect to the specific component and the percentage of the specific component in the vaporized material flowing through conduit 37. In the described example, the vapor material in the conduit 37 has oxygen composition of about 37.5% and such material is mixed at point 39 with the proper quantity of high purity oxygen of 90% to 98% purity in conduit 38 to provide a composite stream in conduit 40 having an oxygen composition of about 47%.

In accordance with the preferred form of the present invention the auxiliary fluid such as the oxygen-rich gas in the conduit 38 is derived from liquid material such as a source of high purity liquid oxygen which is used to cool the incoming feed mixture. As shown, high purity liquid oxygen is conducted by conduit 19 to the shell side of the heat exchange device 18 where the liquid oxygen is vaporized in heat exchange effecting relation with the feed mixture flowing through the tube side of the exchanger; the resulting vapor being withdrawn through the conduit 38.

The present invention also provides an arrangement for aid in starting up of the system. For this purpose cooled gaseous feed mixture is withdrawn from the conduit 20 and passed through conduit 50 having a control valve 51, for expansion with external work in an expansion engine 52; the temperature of the gaseous mixture withdrawn from the conduit 20, or another point in the system, being such that liquid will not form during the expansion step. The effluent from the expansion engine is passed by conduit 53, which may be provided with a control valve 54, to the separator 25 and then through conduit 15 or 30 to the heat exchange device 14 in countercurrent heat interchange with the feed mixture. If desired, the expansion engine 52 may be employed during normal operation of the system.

In some applications of the present invention it may be necessary to pass the product stream in conduit 40 in switching heat interchange with the feed mixture to prevent accumulation of high boiling point deposits in the heat interchange device 14. This may be accomplished by dividing the feed mixture in conduit 10 for flow through a pair of switching heat exchangers. One portion of the feed mixture flowing in switching heat interchange with vapor from the conduit 28 and another portion of the feed mixture being in switching heat interchange with the product stream from conduit 40; the portions of the feed mixture being proportioned relative to the mass of the streams in conduits 28 and 40.

Although the present invention has been described in connection with preferred embodiments, it is to be understood that various changes and modifications may be made without departing from the spirit of the invention, as understood by those skilled in the art. Reference therefore will be had to the appended claims for a definition of the invention.

What is claimed is:

1. Method of producing a gaseous product including a high boiling point component and a low boiling point component with the high boiling point component being a predetermined percentage of the gaseous product, comprising the steps of providing compressed gaseous mixture including components of the gaseous product with the percentage of the high boiling point component being less than the percentage of the high boiling point component of the gaseous product, cooling compressed gaseous mixture and expanding the cool gaseous mixture to effect partial liquefaction of the gaseous mixture, the liquefied portion being enriched in the high boiling point component with the percentage of the high boiling point component being greater than the percentage of the high boiling point component of the gaseous mixture and less than the percentage of the high boiling point component of the gaseous product, separating the liquefied portion of the gaseous mixture from the unliquefied portion of the gaseous mixture, the separated liquefied portion of the gaseous mixture having a percentage of the high boiling point component substantially equal to the percentage of the high boiling point component of the unseparated liquefied portion of the gaseous mixture, utilizing the separated unliquefied portion to cool the compressed gaseous mixture, vaporizing the separated liquefied portion to provide vapor enriched in the high boiling point component, providing a fluid including the high boiling point component of a percentage greater than the percentage of the high boiling point component of the liquefied portion, adding a quantity of said fluid to the vapor enriched in the high boiling point component to provide a composite stream including a percentage of the high boiling point component corresponding to the percentage of the high boiling point component of the gaseous product, and passing the composite stream in heat interchange with the compressed gaseous mixture and then delivering the composite stream as the gaseous product.

2. Method of producing a gaseous product as defined in claim 1 including the steps of passing the compressed gaseous mixture in countercurrent heat interchange with the separated unliquefied portion of the gaseous mixture in a switching heat exchange zone and of passing the composite stream through a passageway of the heat exchange zone in countercurrent heat interchange with the compressed gaseous mixture.

3. Method of producing a gaseous product including a high boiling point component and a low boiling point component with the high boiling point component being a predetermined percentage of the gaseous product, comprising the steps of providing compressed gaseous mixture including components of the gaseous product with the percentage of the high boiling point component being less than the percentage of the high boiling point component of the gaseous product, cooling compressed gaseous mixture and expanding the cool gaseous mixture to effect partial liquefaction of the gaseous mixture, the liquefied portion being enriched in the high boiling point component with the percentage of the high boiling point component being greater than the percentage of the high boiling point component of the gaseous mixture and less than the percentage of the high boiling point component of the gaseous product, separating the liquefied portion of the gaseous mixture from the unliquefied portion of the gaseous mixture, the separated liquefied portion of the gaseous mixture having a percentage of the high boiling point component substantially equal to the percentage of the high boiling point component of the unseparated liquefied portion of the gaseous mixture, utilizing the separated unliquefied portion to cool the compressed gaseous mixture, vaporizing the separated liquefied portion to provide a first vapor enriched in the high boiling point component, providing liquid including the high boiling point component of a percentage greater than the percentage of the high boiling point component of the liquefied portion, vaporizing a quantity of said liquid upon heat interchange with compressed gaseous mixture to provide a second vapor rich in the high boiling point component, adding the second vapor to the first vapor to form a composite stream, and passing the composite stream in heat interchange with the compressed gaseous mixture and then delivering the composite stream as the gaseous product, the quantity of liquid vaporized being such that the composite stream includes a percentage of the high boiling point component corresponding to the percentage of the high boiling point component of the gaseous product.

4. Method of producing a gaseous product as defined in claim 3 including the steps of passing compressed gaseous mixture in heat interchange with said liquid to effect vaporization of the liquid and then passing the compressed gaseous mixture in heat interchange with the separated liquefied portion of the gaseous mixture to effect vaporization of the separated liquefied portion, all prior to the expansion step.

5. Method of producing a gaseous product as defined in claim 4 including the steps of expanding with production of external work a part of the compressed gaseous mixture after heat interchange with the liquid and before heat interchange with the separated liquefied portion of the gaseous mixture and of adding effluent of such expansion to the unliquefied portion of the gaseous mixture utilized to cool the compressed gaseous mixture.

References Cited by the Examiner
UNITED STATES PATENTS

| 2,209,534 | 7/1940 | Moore | 62—11 |
| 2,360,468 | 10/1944 | Brown | 62—29 XR |
| 2,513,306 | 7/1950 | Garbo | 62—22 XR |
| 2,557,171 | 6/1951 | Bodle | 62—31 XR |
| 2,908,144 | 10/1959 | First | 62—13 |

NORMAN YUDKOFF, *Primary Examiner.*